United States Patent [19]
Hansen et al.

[11] Patent Number: 5,924,821
[45] Date of Patent: *Jul. 20, 1999

[54] APPARATUS AND METHOD FOR GAS AND/OR LIQUID EXCHANGE BETWEEN AN AREA OUTSIDE AND AN AREA INSIDE A BULK MATERIAL PILE

[75] Inventors: David Leland Hansen, Averill Park; Donald Vincent Mazzarello, Albany, both of N.Y.

[73] Assignee: Landfill Technologies, Inc., West Sand Lake, N.Y.

[ * ] Notice: This patent is subject to a terminal disclaimer.

[21] Appl. No.: 08/864,600

[22] Filed: May 28, 1997

Related U.S. Application Data

[63] Continuation-in-part of application No. 08/563,998, Nov. 29, 1995, Pat. No. 5,636,940.

[51] Int. Cl.⁶ .................................. B09B 1/00; B09B 3/00
[52] U.S. Cl. ............................................. 405/128; 405/129
[58] Field of Search .................................. 47/74; 71/901; 166/369, 370, 50; 210/901; 405/128, 129, 258

[56] References Cited

U.S. PATENT DOCUMENTS

| | | | |
|---|---|---|---|
| 4,526,615 | 7/1985 | Johnson | 405/129 X |
| 4,670,148 | 6/1987 | Schneider | 405/129 X |
| 4,838,733 | 6/1989 | Katz | 405/129 |
| 4,846,604 | 7/1989 | Holtmann | 405/128 |
| 4,923,333 | 5/1990 | Timmons | 405/128 |
| 5,054,523 | 10/1991 | Rink | 405/128 X |
| 5,067,852 | 11/1991 | Plunkett | 405/128 |
| 5,080,528 | 1/1992 | Ressi di Cervio | 405/128 X |
| 5,246,310 | 9/1993 | Prange et al. | 405/129 |
| 5,265,479 | 11/1993 | Hansen | 405/129 |
| 5,753,494 | 5/1998 | Hater et al. | 405/128 X |

*Primary Examiner*—George Suchfield
*Attorney, Agent, or Firm*—Heslin & Rothenberg, P.C.; Wayne F. Reinke, Esq.

[57] ABSTRACT

Gas and/or liquid exchange between an area within a bulk material pile and an area outside the bulk material pile is enabled by establishing a conduit, e.g., a pipe, between the area outside the bulk material pile and the area within the bulk material pile during the formation of the pile and without digging a trench. A porous medium is placed around the conduit in the bulk material pile during formation and without digging a trench to provide for gas and/or liquid exchange between the bulk material and the conduit. The porous medium could be washed stone, or scrap tires and glass bottles. In other embodiments, a conduit is established between the bulk material pile and an area outside the pile, and a leaching chamber is placed over or around the conduit in the pile for gas and/or liquid exchange between the pile and the conduit.

48 Claims, 8 Drawing Sheets fig. 1 fig. 2 fig. 3 fig. 4 fig. 5 fig. 6a fig. 6b fig. 6c fig. 7 fig. 11A fig. 8 fig. 9 fig. 10 fig. 11 fig. 12

APPARATUS AND METHOD FOR GAS AND/ OR LIQUID EXCHANGE BETWEEN AN AREA OUTSIDE AND AN AREA INSIDE A BULK MATERIAL PILE

This application is a continuation-in-part of application Ser. No. 08/563,998, filed on Nov. 29, 1995, now U.S. Pat. No. 5,636,940.

BACKGROUND OF THE INVENTION

1. Technical Field

The present invention generally relates to gas and/or liquid exchange. More particularly, the present invention relates to gas and/or liquid exchange between a first area within a bulk material pile and a second area outside the bulk material pile via a conduit connecting the first and second areas.

2. Background Information

When placed in a pile, bulk materials, such as organic solid waste, decompose or otherwise interact to create gases. For organic solid waste, the gases are principally methane and carbon dioxide, with small amounts of hydrogen sulfide, mercaptan and other trace gases. Landfills housing organic solid waste piles are a significant source of such gases, which are odorless, flammable, explosive, toxic and contribute to atmospheric deterioration. Combustion or other treatment of collected landfill gases is a common way to mitigate the negative effects of the raw gas emissions.

Existing commercially available gas extraction systems primarily include vertical drilled wells and associated piping and valves, which are installed only after a given section of the landfill is completely filled and capped. This may be many years after gas production is occurring at high rates in the waste mass, allowing a significant volume of solid waste gases to be emitted uncontrolled prior to installation of such systems. In addition, such vertical systems are prone to clogging.

More recently, trenches have been dug in existing solid waste piles, with piping (including perforated piping) and surrounding stone installed for gas removal. However, while this horizontal method is an improvement over vertical wells, this solution has its drawbacks. For example, the trenches are dug after a time when the solid waste pile has built up potentially dangerous gases and likely created an odor problem. Further, this after-the-fact solution requires additional effort (e.g., digging a trench) over a solution integrated into the formation of the solid waste pile.

Another problem is that low moisture content within a solid waste pile slows microbial activity, thus prolonging the time that the solid waste is in an unstable, dynamic biological state. This condition requires greater surveillance and maintenance efforts. Organic waste that is fully biostabilized, such as cured compost, is much more desirable, due to predictable settlement rates and reduced gas production.

Thus, a need exists for a way to provide gas and/or liquid exchange between an area within a bulk material pile and an area outside the bulk material pile.

SUMMARY OF THE INVENTION

Briefly, the present invention satisfies the need for gas and/or liquid exchange between an area within a bulk material pile and an area outside the bulk material pile by providing a conduit surrounded by a leaching chamber within the bulk material pile during formation of the pile for the gas and/or liquid exchange with the area outside the bulk material pile.

In accordance with the above, it is an object of the present invention to provide apparatus for gas and/or liquid exchange with a bulk material pile.

It is another object of the present invention to provide a method for gas and/or liquid exchange with a bulk material pile.

The present invention provides, in a first aspect, apparatus for gas and/or liquid exchange between a first area inside a bulk material pile and a second area outside the bulk material pile. The apparatus comprises a leaching chamber for placement within the first area during formation of the bulk material pile, and a conduit for placement partially within the leaching chamber and partially in the second area to provide a medium for the gas and/or liquid exchange.

The present invention provides, in a second aspect, a method of exchanging gas and/or liquid between an area inside and an area outside a bulk material pile, corresponding to the first aspect.

The present invention provides, in a third aspect, apparatus for gas and/or liquid exchange between a first area within a bulk material pile and a second area outside the bulk material file. The apparatus comprises a conduit for establishing partially within the first area and partially within the second area to provide a medium for the gas and/or liquid exchange, and a leaching chamber for placing over the conduit in the first area for gas and/or liquid exchange between the conduit and bulk material in the bulk material pile.

The present invention provides, in a fourth aspect, a method of exchanging gas and/or liquid between an area inside and an area outside a bulk material pile, corresponding to the third aspect.

These, and other objects, features and advantages of this invention will become apparent from the following detailed description of the various aspects of the invention taken in conjunction with the accompanying drawings.

BEST MODE FOR CARRYING OUT THE INVENTION

Figure 1:
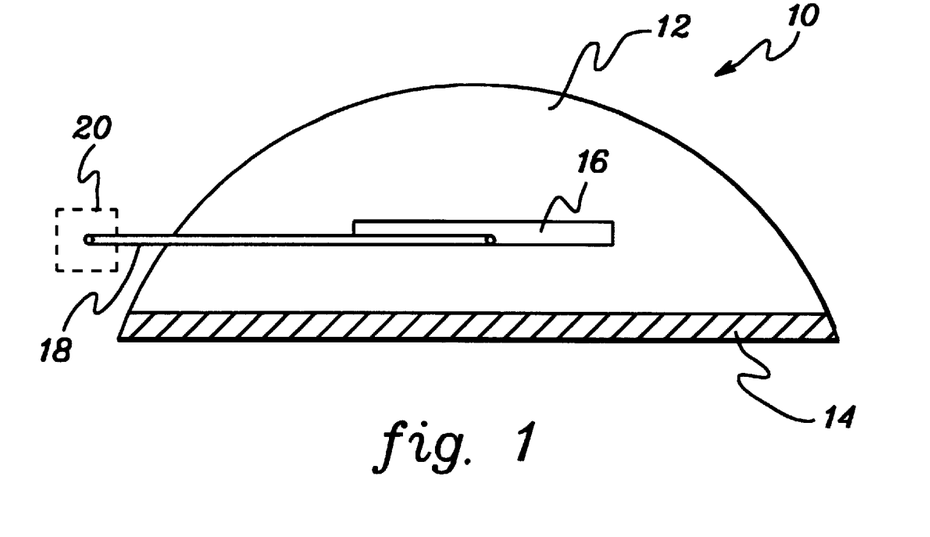
FIG. 1 is a cross-sectional view of a bulk material pile constructed in accordance with the present invention.

FIG. 1 is a cross-sectional view of a bulk material pile 10 constructed in accordance with the present invention. Bulk material pile 10 is situated on a base 14, and comprises bulk material 12, substantially horizontal cavity 16 and conduit 18. Although only one conduit is shown, the present invention contemplates any number. Cavity 16 is created, preferably during the formation of bulk material pile 10, by the addition of some structure that both discourages the intrusion of bulk material 12 into cavity 16 and encourages gas and/or liquid exchange between the cavity and area 20 outside bulk material pile 10. If cavity 16 is created during the formation of bulk material pile 10, the need for digging trenches, as with already-created piles, is removed.

As used herein, the term "bulk material" is intended to encompass any material that, when in a pile, would benefit from gas and/or liquid exchange; that is, removal of a gas and/or liquid produced therein, or the addition of a gas and/or liquid there into (as opposed to merely adding to the surface of the pile). One example of a bulk material is solid waste such as might be found in a landfill. As used herein, the term "conduit" means any structure that is capable of being a medium for channeling a gas and/or liquid, depending on the situation, between at least two locations. One example of a conduit is a pipe or system of pipes. As used herein, the term "substantially horizontal" is intended to distinguish from vertical and includes a slope of up to about five degrees. The term "substantially horizontal" is also intended to refer to surfaces that, although roughly horizontal in the aggregate, may contain localized dips or humps.

Figure 2:
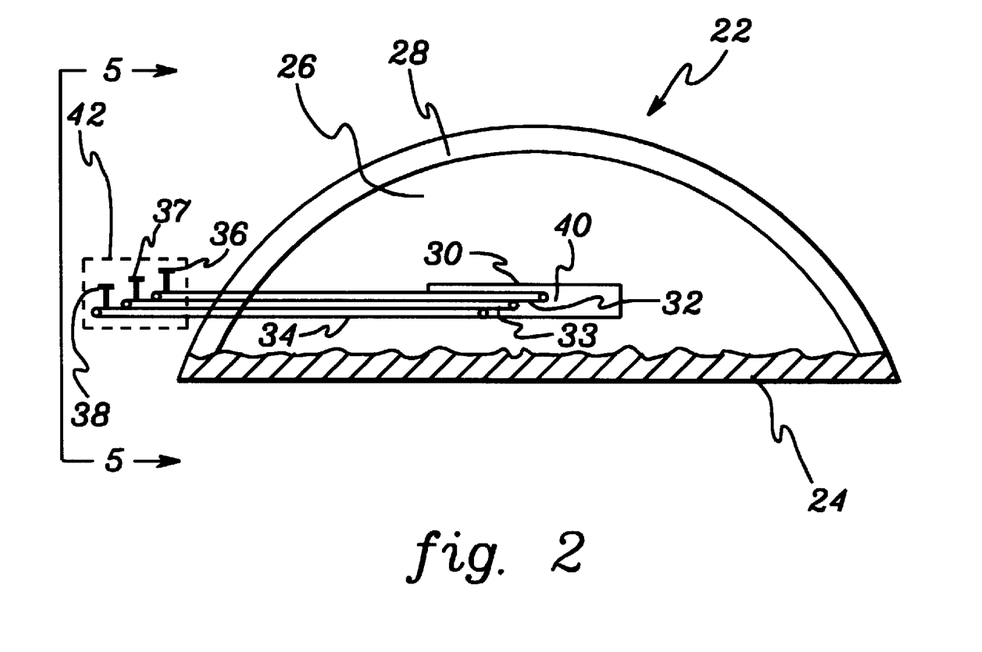
FIG. 2 is a cross-sectional view of a solid waste pile constructed in accordance with the present invention.

FIG. 2 is a cross-sectional view of a solid waste pile 22 constructed in accordance with the present invention. Solid waste pile 22 is situated on ground 24 and comprises solid waste 26, solid waste cap 28, elongated leaching chamber 30 and conduits 32, 33 and 34. As used herein, the term "elongated leaching chamber" refers to a leaching chamber existing along a roughly horizontal line through a majority of a width of a given bulk material pile. For solid waste, the leaching chamber is preferably elongated, so that conduits into the leaching chamber are accessible from outside the solid waste pile without an undue amount of the conduit existing in the pile uncovered. Conduits 32, 33 and 34 extend outside solid waste pile 22 and terminate at valves 36, 37 and 38, respectively. Valves 36, 37 and 38 are preferably the "butterfly" type, as they are known in the art. Solid waste cap 28 provides a barrier between solid waste 26 and the ambient air and could be, for example, a layer of dirt. As used herein, the term "leaching chamber" refers to any structure that creates a cavity within a bulk material pile and discourages intrusion of bulk material (here, solid waste 26) into an area (here, area 40) surrounding the portion of the conduit(s) (here, conduits 32, 33 and 34) covered thereby, while encouraging gas and/or liquid exchange between the bulk material pile and the cavity. The conduit(s) may then be used to exchange gas and/or liquid to/from the cavity.

Before solid waste 26 stabilizes, the decomposition thereof typically creates solid waste gases within the solid waste pile, for example, methane, carbon dioxide, hydrogen sulfide, and mercaptan. As used herein, the term "solid waste gas" refers to any single gas or combination of gases produced by the decomposition or other interaction of solid waste. The build-up of solid waste gases can create an unpleasant and potentially dangerous environment. Leaching chamber 30 allows the solid waste gases to enter area 40, rather than being released into the ambient air. Valves 36, 37 and 38 can be opened to allow the built-up solid waste gases to escape or be extracted, reducing the unpleasant and dangerous conditions. Conventional or other methods of disposing of collected solid waste gases may then be used, such as combustion.

One way to accelerate the decomposition and resultant stabilization of a solid waste pile is to add moisture thereto. A liquid, for example, water, can be added to solid waste 26 through conduits 32, 33 and 34. Optionally, waste water collected in the landfill, referred to as "leachate" could be injected into area 40 through conduits 32, 33 and 34. As used herein, the term "injected" includes any method of getting liquid into a bulk material pile through a conduit, including, for example, gravity or pressure. This would provide a low-cost method of leachate disposal while also accelerating the solid waste decomposition process.

Figure 3:
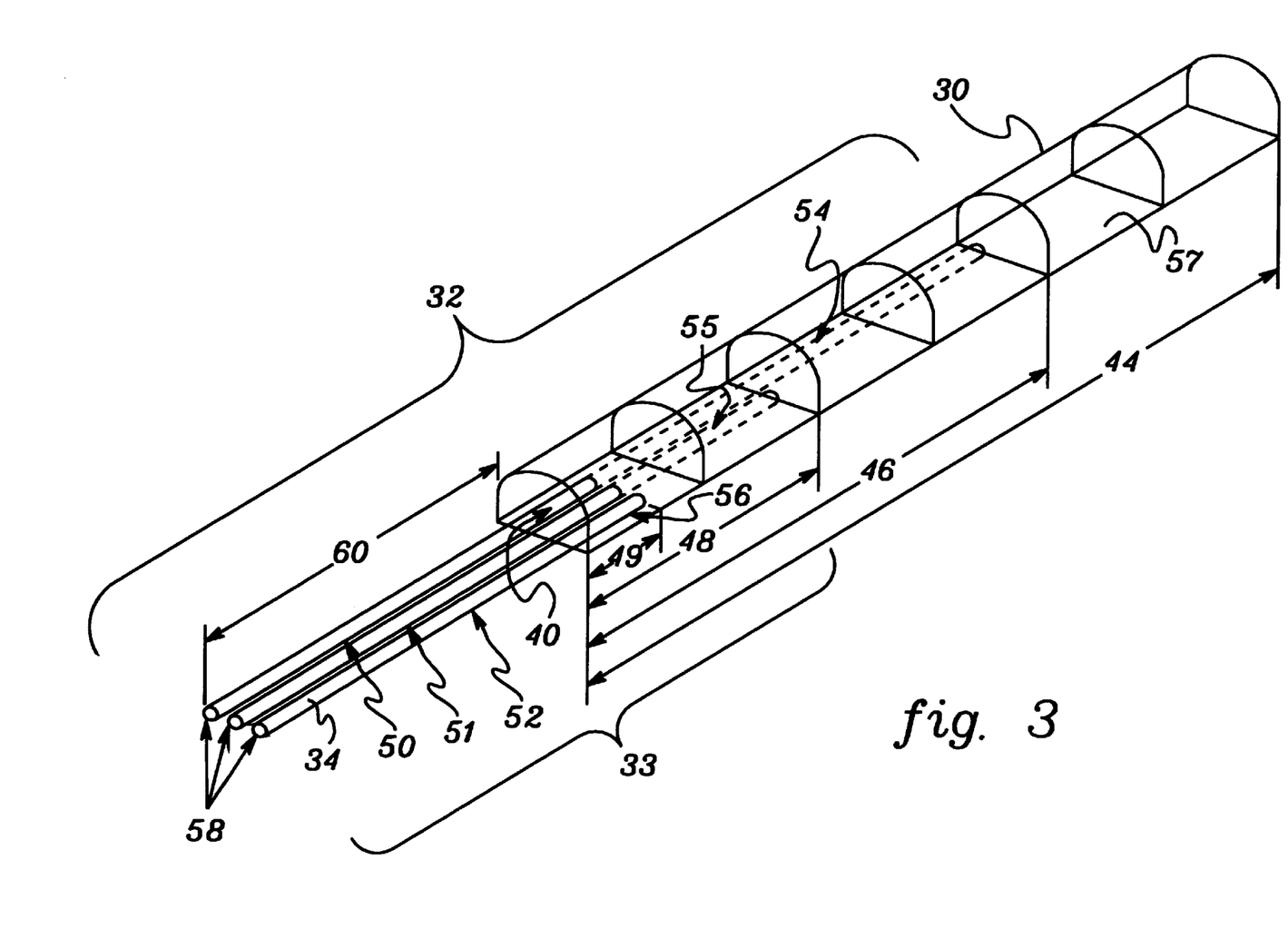
FIG. 3 is a perspective view of the elongated leaching chamber and conduits of FIG. 2.

FIG. 3 is a perspective view of elongated leaching chamber 30 and conduits 32, 33 and 34 of FIG. 2, shown in greater detail. Assume that leaching chamber 30 has a length 44 given as L. Preferably, for the present solid waste pile example, conduit 32 extends into area 40 a length 46, which is about (2*L)/3; that is, two thirds of L. Also preferably, conduit 33 extends into area 40 a length 48, which is about L/3; that is, one third of L, and conduit 34 extends just into area 40, a length 49, which is less than length 48. In this way, gas and/or liquid exchange reaches throughout area 40. Portions 50, 51 and 52 of conduits 32, 33 and 34, respectively, extend outside area 40 and should be strong enough to prevent collapsing under the weight of the solid waste on top thereof. For example, PVC (poly(vinyl chloride)) pipe of sufficient size for the particular solid waste pile could be used for conduit portions 50, 51 and 52. Since portions 54, 55 and 56 of conduits 32, 33 and 34, respectively, are covered by leaching chamber 30, they need not be as strong as portions 50, 51 and 52, however, they could be. In the present example, portions 54 and 55 are thin-wall roll drainage pipes. At least some areas of chamber floor 57 are in some manner left open to the solid waste so that gas and/or liquid exchange with the solid waste pile is encouraged. Valves 36, 37 and 38 (not shown in FIG. 3) attach at pipe ends 58. For a typical solid waste pile in a landfill, a length 60 of conduit portions 50, 51 and 52 might be about 16 feet, and length 49 might be about 4 feet.

Figure 4:
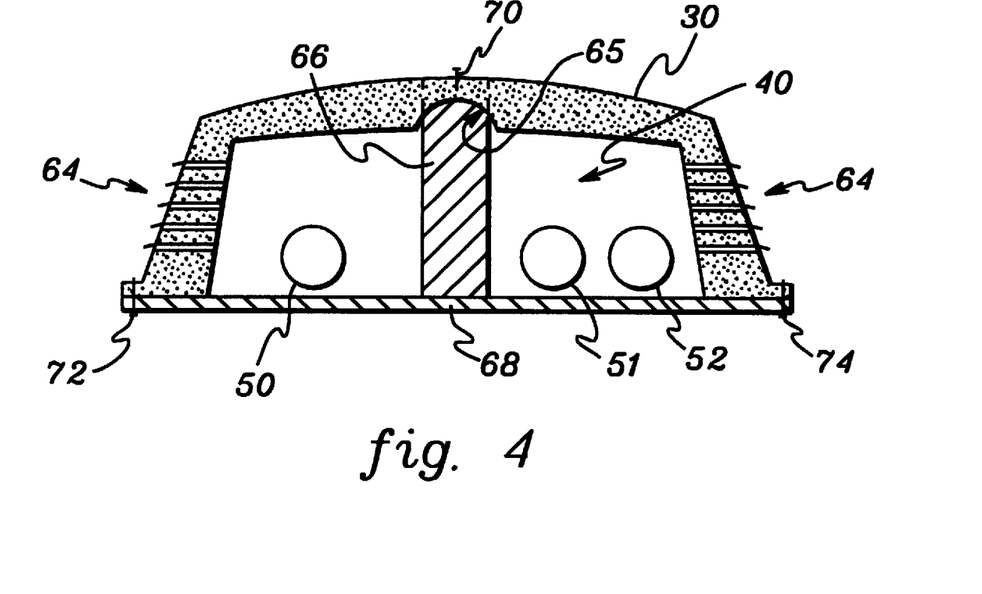
FIG. 4 is a cross-sectional view of the elongated leaching chamber of FIG. 3.

FIG. 4 is a cross-sectional view of elongated leaching chamber 30 from FIG. 3. Leaching chamber 30 is dome-like in shape, although other shapes are possible, such as a rectangle. Optional louvered vents 64 serve as another entrance for gases produced by the solid waste to enter area 40 while discouraging the intrusion of solid waste into area 40. Vents 64 also serve as another exit for liquid entering area 40 through conduits 32, 33 and 34. The vents amplify the porosity of the leaching chamber. As shown in FIG. 4, leaching chamber 30 may take the form of a conventional sectioned molded plastic leaching chamber, such as that used in leach fields. Indentation 65 is meant for piping in a leach field environment, but has no use in the present example. Alternatively, a leaching chamber could be custom designed to suit the particular situation that does not need reinforcing members. However, conventional leaching chambers may not be strong enough to withstand the weight of some bulk material piles. Thus, conventional leaching chambers may need to be reinforced.

Vertical reinforcing member 66 and horizontal reinforcing member 68 are added in the present example to ensure the stability of leaching chamber 30. Vertical reinforcing member 66 may be, for example, a recycled plastic load column, and horizontal reinforcing member 68 may be, for example, a recycled plastic strap. Vertical reinforcing member 66 is secured to leaching chamber 30 with, for example, self-tapping polymer joining screw 70. Similarly, horizontal reinforcing member 68 may be secured to leaching chamber 30 by, for example, self-tapping polymer joining screws 72 and 74. It will be understood that several sets of reinforcing members 66 and 68 would be spaced apart along the length of elongated leaching chamber 30, leaving "floor" spaces in area 40 of solid waste, the main entrance/exit for gases and/or liquid into or out of the solid waste pile.

Figure 5:
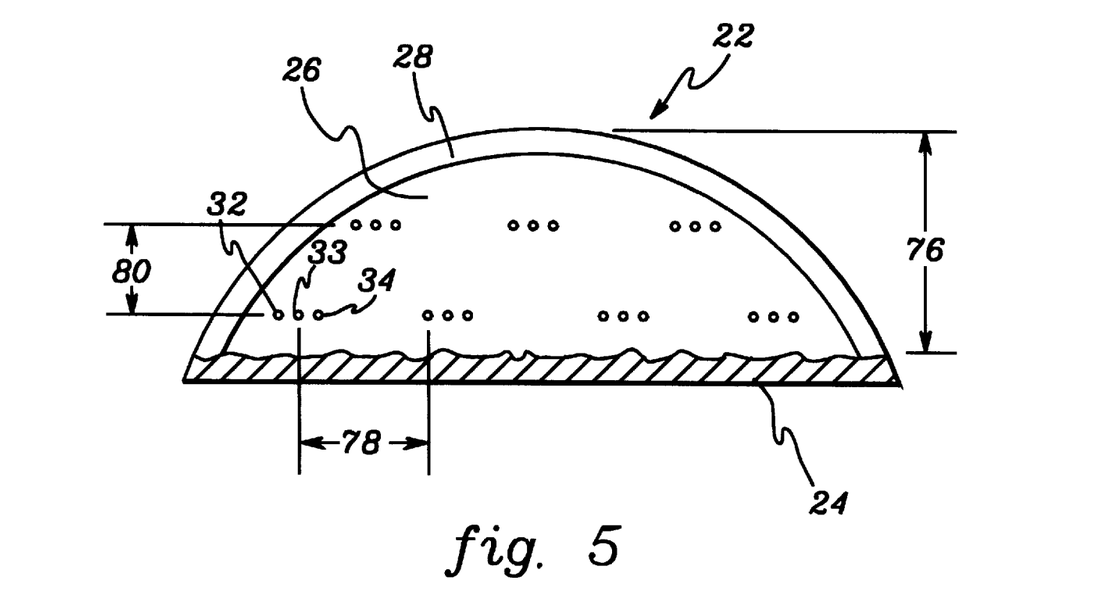
FIG. 5 depicts a side view of the solid waste pile of FIG. 2.

FIG. 5 depicts a side view along line 5 of solid waste pile 22 of FIG. 2, and shows exemplary spacing for multiple sets of conduits. Assume solid waste pile 22 has a height 76 with respect to ground 24. Horizontal spacing between conduit sets is given as dimension 78, and vertical spacing between conduit sets is given as dimension 80. If height 76 were about 100 feet, then horizontal spacing 78 would preferably be about 100 feet and vertical spacing 80 would preferably be about 20 feet.

A method of forming a bulk material pile according to the present invention will now be described with reference to solid waste pile 22 in FIG. 2. The general concept is to create a substantially horizontal cavity in a bulk material pile, preferably during formation of the pile to avoid having to dig a trench. A conduit is established between the cavity and an area outside the bulk material pile. Once the cavity and conduit are in place, gas and/or liquid exchange can take place between the cavity and the area outside the bulk material pile.

Figure 6A:
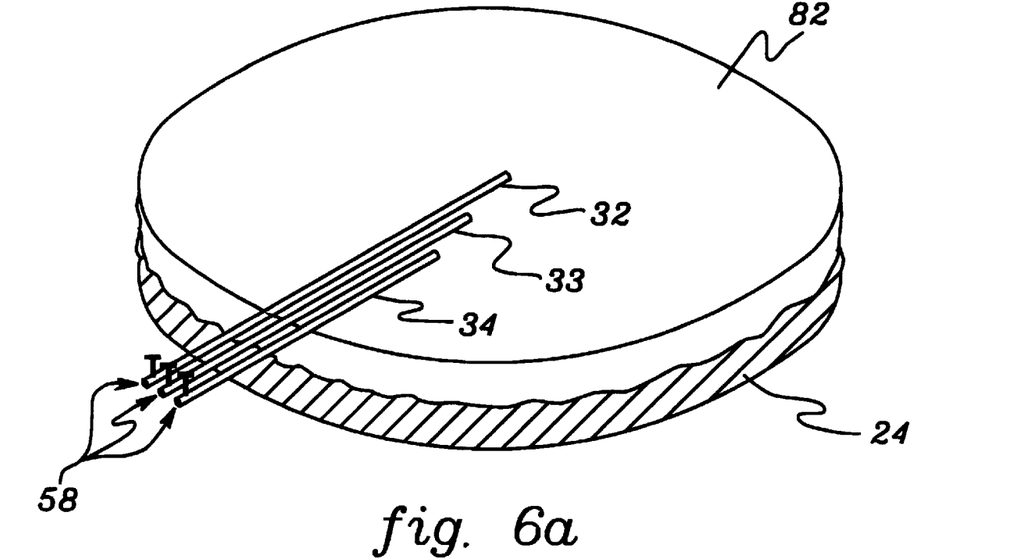
FIGS. 6a–6c depict various stages in the construction of the solid waste pile of FIG. 2.
Figure 6B:
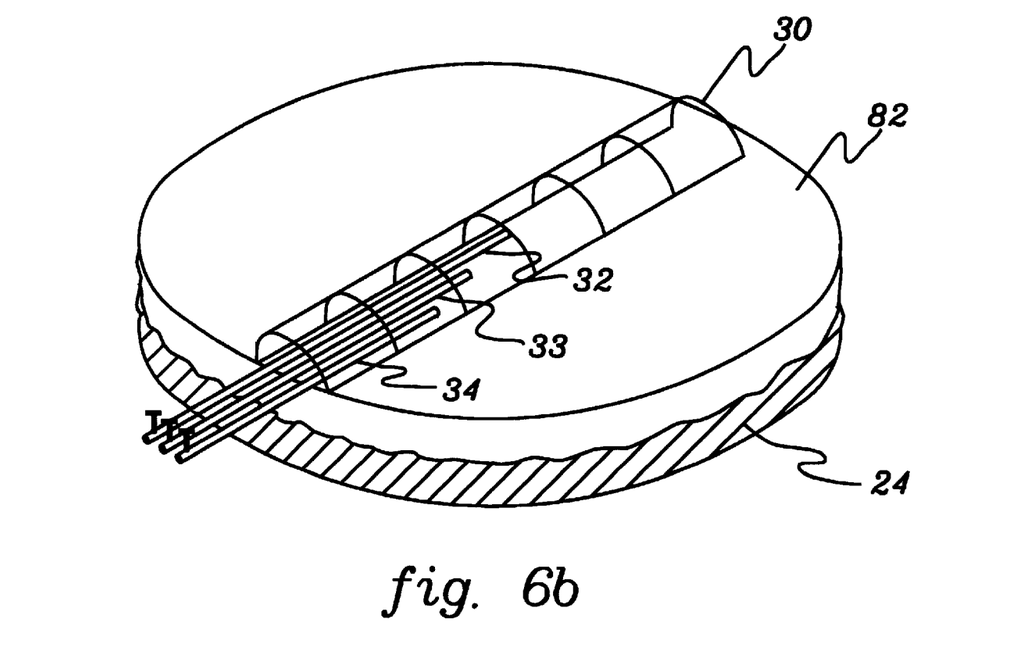
Figure 6C:
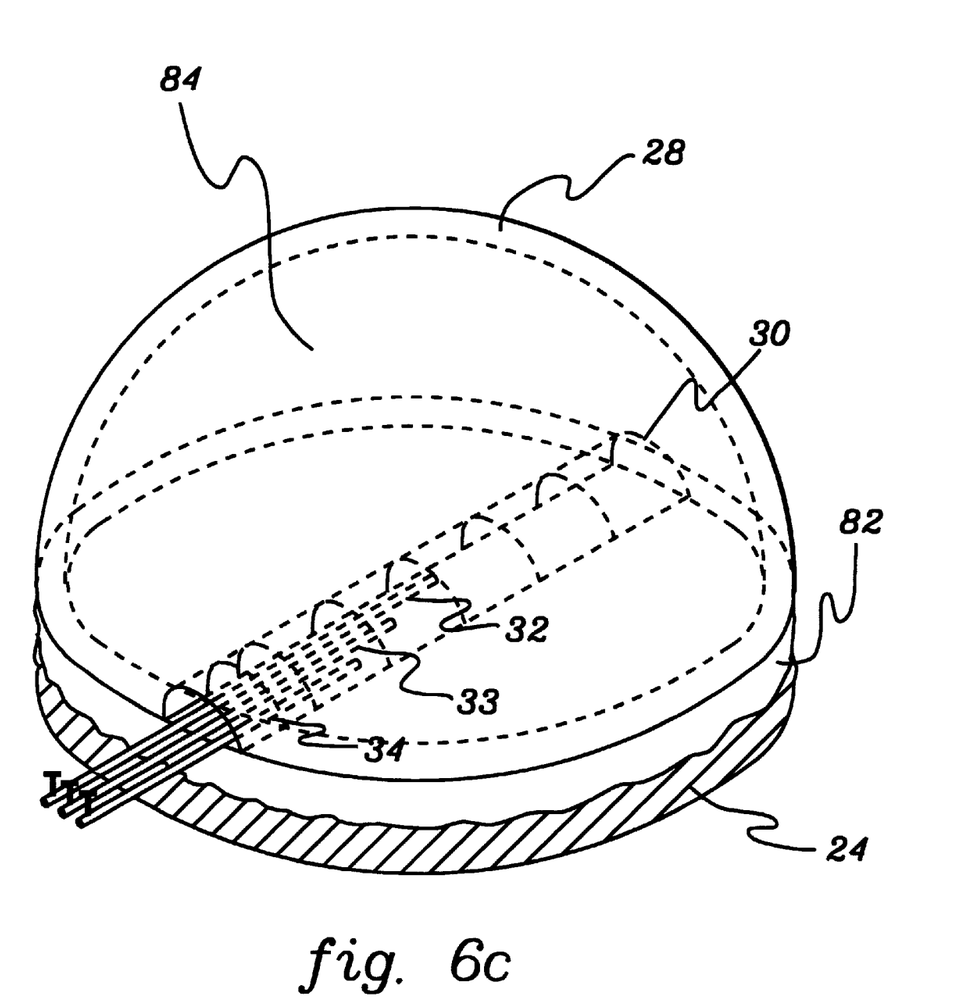

FIG. 6a depicts conduits 32, 33 and 34 from FIG. 2 placed substantially horizontally on a first layer 82 of solid waste. Layer 82 gently slopes toward the center thereof. The gentle slope helps prevent liquid from weeping to the exit points 58 of conduits 32, 33 and 34. It will be understood that if one wanted to extract a liquid from a bulk material pile, then the first layer of bulk material may be sloped toward the edge rather than the center. As shown in FIG. 6b, elongated leaching chamber 30 is then constructed so that it covers the desired portions of conduits 32, 33 and 34. With the particular example given above using conventional sectioned leaching chambers, one could accomplish the task of establishing the conduit portions in a cavity by first placing the conduits inside inverted leaching chamber sections, connecting the reinforcing members to the relevant sections, turning over the leaching chamber sections and then connecting the sections (conventional sectioned leaching chambers include some type of interlocking closure mechanism). After the leaching chamber is placed, a second layer 84 of solid waste may then be deposited thereover, and the capping layer 28 added (see FIG. 6c). Preferably, several feet of solid waste is placed around and above elongated leaching chamber 30 and compacted with conventional compaction equipment before normal traffic is run over the chamber and the pile and cap finished.

Figure 7:
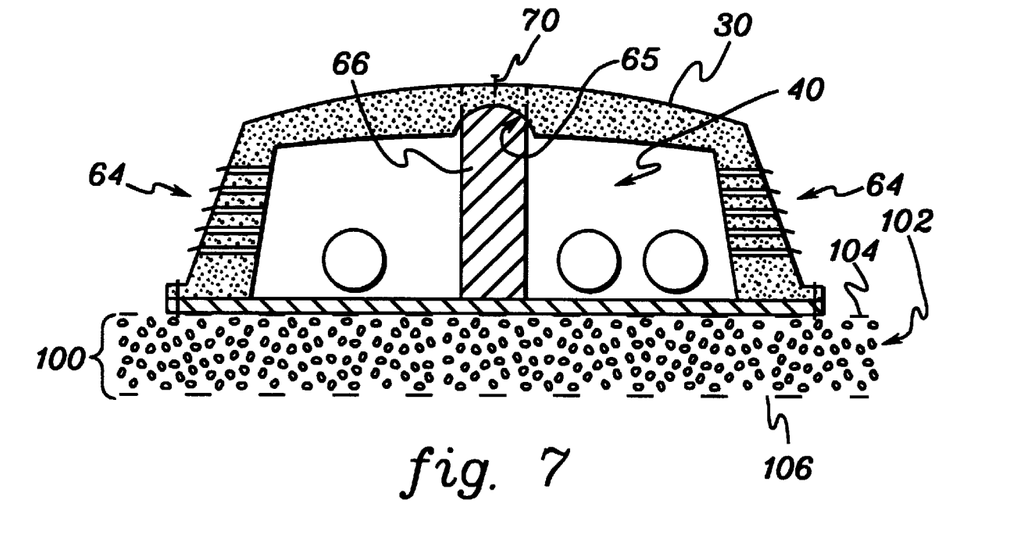
FIG. 7 is a cross-sectional view of the leaching chamber of FIG. 4 on a base according to another aspect of the invention.

FIG. 7 is a cross-sectional view of leaching chamber 30 from FIG. 4 placed on a base 100. The base provides a more reliable foundation for the reinforcing members, as well as better long-term stability in the waste mass. One example of base 100 will now be given, however, it will be understood that other base configurations may be used, so long as they provide a more reliable foundation and better long-term stability for the leaching chamber than the bulk material. Base 100 comprises approximately 6 inches of stone sandwiched between layers 104 and 106 of a tension fabric. Preferably, the stones are about 1½" in size. One example of a tension fabric is a high density polyethylene geogrid tension fabric. Currently, such a fabric is available under the trade name "BX 1100 GEOGRID" from the Tensar Corporation.

Figure 8:
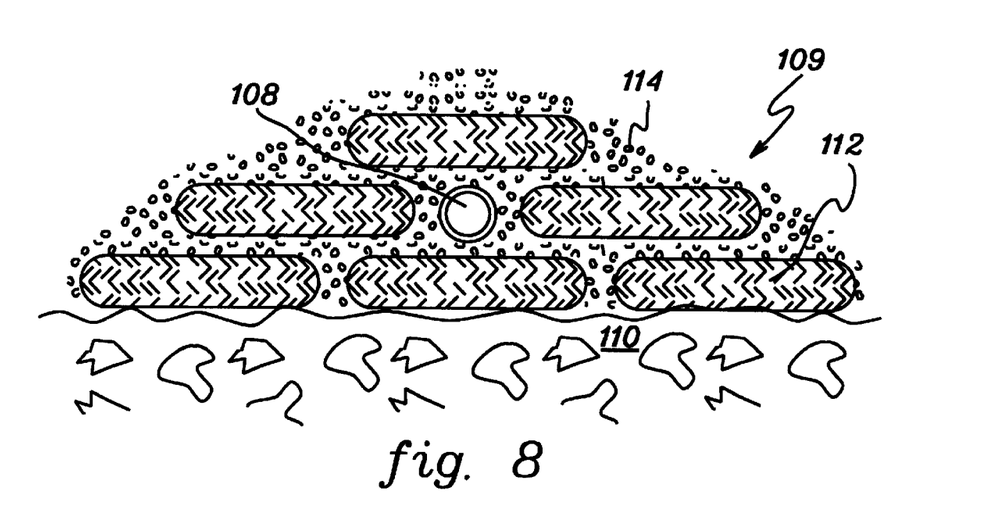
FIG. 8 is a cross-sectional view of another aspect of the present invention.

FIG. 8 is a cross-sectional view of an alternative embodiment to the previously described leaching chambers. As used herein, the term, "porous medium" refers to any medium sufficiently porous to allow gas and/or liquid therethrough. Shown in FIG. 8 is a conduit 108 surrounded by porous medium 109 on top of a solid waste pile 110 in progress. In this embodiment, conduit 108 must be strong enough to withstand the weight of the porous medium and bulk material, and may comprise, for example, high-density polyethylene piping. Preferably, porous medium 109 comprises long-lasting waste materials, however, other materials could be used, for example, stone. Porous medium 109 in this example comprises scrap tires (e.g., tire 112) stacked in a pyramid fashion around conduit 108. In and around the tires are placed whole glass bottles 114. Using long-lasting waste materials such as these not only reduces what is added to the landfill (since it is already there), but also reduces the cost of implementing the invention. An exemplary alternative to glass bottles is stone, preferably of about 1½"–2" in size. In this way, gas and/or liquid exchange is achieved without digging a trench, and the conduit and porous medium are installed during bulk material pile formation.

Figure 9:
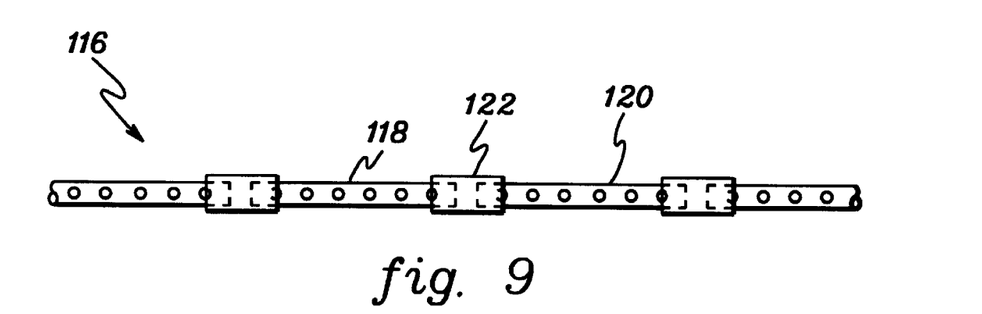
FIG. 9 is an exemplary embodiment of a piping system that could be used in the apparatus of FIG. 8.

FIG. 9 is a detailed view of one embodiment of conduit 108 in FIG. 8. Shown in FIG. 9 is a pipe system 116, comprising several sections of perforated pipe, for example, 4 inch perforated SDR 17 HDPE (high-density polyethylene) pipe (e.g., pipe sections 118 and 120). Preferably, the perforated pipe sections are about 20 feet in length where the bulk material is solid waste in a landfill. The perforated pipe sections are joined by a conventional loose sleeve joint (e.g., loose sleeve joint 122). Loose sleeve joint 122 is simply a larger section of piping, preferably, for present purposes, about 6 feet in length placed over the ends of the perforated piping sections. The loose sleeve joint could be, for example, 6 inch solid SDR 17 HDPE pipe. The loose sleeve joint allows for expansion, contraction and lateral movement without breaking or straining joints. It will be understood that other loose sleeve joints could be used, so long as they allow for these changes.

Figure 10:
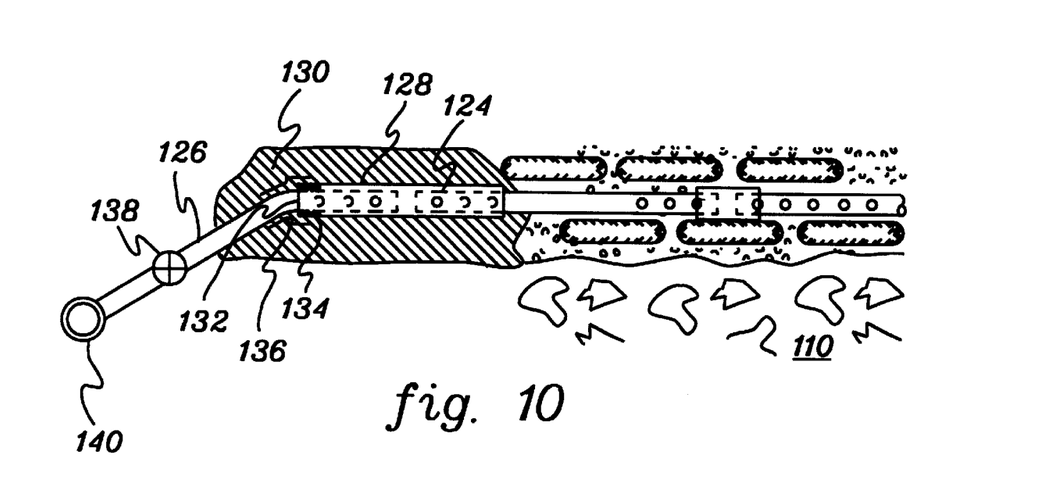
FIG. 10 is a cross-sectional view of the apparatus of FIG. 8 with the piping system of FIG. 9.

FIG. 10 is a side cross-sectional view of the apparatus shown in FIG. 8 with the piping system of FIG. 9. It will be understood that the piping and porous medium are installed while the solid waste pile 110 is being made, and that, therefore, no trenches need to be dug. At the outer edge of the solid waste pile 110 are 4 inch solid HDPE pipes 124 and 126 connected to piping system 116. Surrounding pipes 124 and 126 is a 6 inch solid HDPE pipe 128. Pipe 128 is the loose sleeve joint for pipes 124 and 126. Surrounding pipe 128 is clay soil 130, providing a seal for the piping. At the left end 132 of pipe 128 is a silicone seal 134 on the inside and a coupling 136 on the outside. Preferably, coupling 136 comprises a rubber sleeve for placement over the piping, with at least one clamp at either end. Coupled to the end of pipe 126 is a valve 138 and gas manifold 130. Valve 138 could be, for example, a butterfly valve. In this way, gas can be extracted from solid waste pile 110 safely. It will also be understood that gas and/or liquid could be extracted from or injected into solid waste pile 110 through the pipe system described above.

Figure 11:
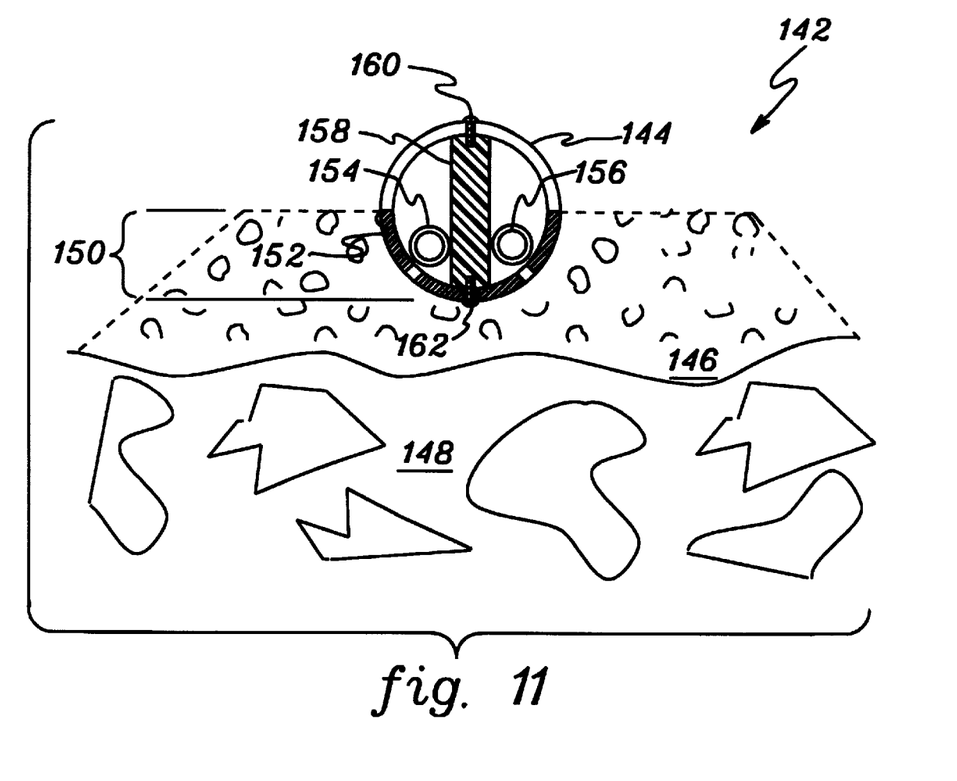
FIG. 11 is a cross-sectional view of another embodiment of the invention of the first aspect.

FIG. 11 is a cross-sectional view of apparatus 142 for gas and/or liquid exchange with a bulk material pile according to the present invention. Apparatus 142 is installed without digging a trench, and comprises a CULVERT pipe 144 partially submerged within a porous medium 146 that lies on top of a bulk material pile 148 in progress. CULVERT pipe 144 is another embodiment of a leaching chamber in accordance with the present invention. As with the embodiment of FIG. 8, the porous medium is preferably scrap glass (e.g., whole or crushed bottles), plastic and/or tires (whole or shredded), but could also be materials such as crushed stone. CULVERT pipe 144 is perforated in a lower half 150 thereof via a plurality of slotted openings (e.g., slotted opening 152) placed in a staggered pattern. Optional pipes 154 and 156 cooperate with the slotted openings to enable the introduction of liquid into bulk material pile 148. Where the bulk material pile comprises, for example, solid waste, the liquid could be, for example, a leachate. A reinforcing member 158 is situated within CULVERT pipe 144 and connected thereto in any number of conventional ways, such as, for example, via stainless steel screws 160 and 162.

Figure 11A:
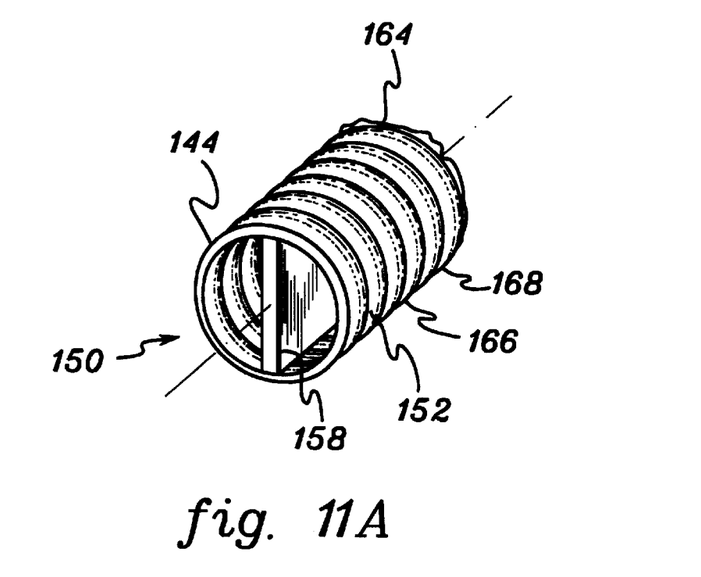
FIG. 11A is a perspective view of the apparatus of FIG. 11.

Preferably, for landfills, CULVERT pipe 144 comprises high density polyethylene corrugated "CULVERT" pipe of between about 12" and 24" in diameter. As shown in FIG. 11A, the corrugation of pipe 144 creates ribs (e.g., rib 164), between which the staggered slotted openings (e.g., openings 152, 166 and 168) can be placed in lower pipe half 150. The slotted openings are not placed in the upper half of pipe 144 to prevent excessive entry of moisture into pipe 144, and are staggered to prevent compromising the structural integrity of the pipe. Also preferably, reinforcing member 158 takes the form of a load column made with recycled plastic. Reinforcing member 158 helps prevent pipe 144 from being crushed under the weight of the bulk material pile, which will be continued on top thereof. Since apparatus 142 is installed while the bulk material pile is in progress, no trenches need to be dug, thereby reducing the time, effort and cost of the project. Also preferably, optional pipes 154 and 156 are comprised of high density polyethylene.

Figure 12:
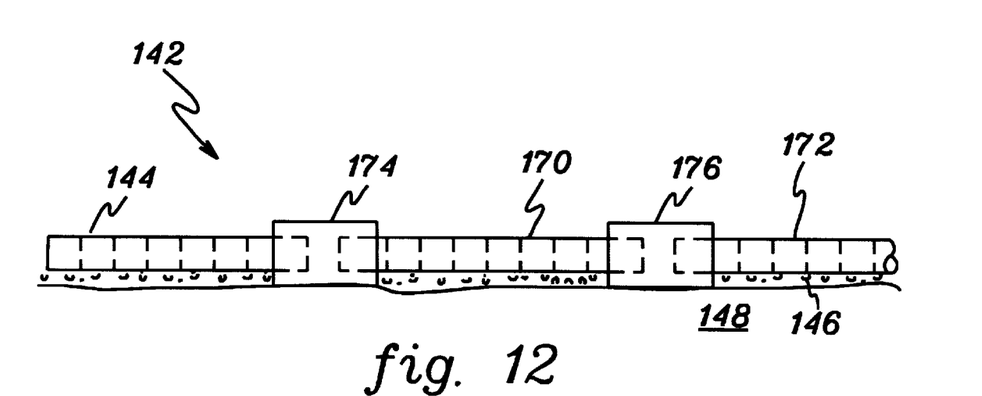
FIG. 12 is a side view of the apparatus of FIG. 11.

FIG. 12 is a side view of apparatus 142 from FIG. 11. CULVERT pipe sections 144, 170 and 172 are coupled via loose sleeve joints 174 and 176. As with FIG. 9, the loose sleeve joints could be, for example, relatively short sections of larger diameter piping, CULVERT or otherwise. For landfills, the sections are preferably about twenty feet in length, with the loose sleeve joints preferably being about six feet in length. Also preferably, reinforcing members are placed about every two feet in sections 144, 170 and 172. However, it will be understood that different piping and other materials could be used without departing from the spirit and scope of the invention.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. Apparatus for gas and/or liquid exchange between a first area inside a bulk material pile and a second area outside the bulk material pile, the apparatus comprising:
   at least one leaching chamber for placement within the first area during formation of the bulk material pile; and
   a conduit for placement partially within the at least one leaching chamber and partially within the second area to provide a medium for the gas and/or liquid exchange.

2. The apparatus of claim 1, wherein the conduit comprises at least one pipe.

3. The apparatus of claim 2, further comprising a valve coupled to the at least one pipe in the second area.

4. The apparatus of claim 2, wherein the at least one pipe comprises a pipe of high density polyethylene.

5. The apparatus of claim 1, wherein the at least one leaching chamber comprises at least one culvert pipe with a plurality of reinforcing members and is sized for the conduit to fit therein.

6. The apparatus of claim 5, wherein the at least one culvert pipe comprises at least two culvert pipes joined by a loose sleeve joint.

7. The apparatus of claim 1, wherein the at least one leaching chamber is perforated on a lower portion thereof in the first area.

8. The apparatus of claim 5, wherein the plurality of reinforcing members comprise at least one reinforcing member for vertical placement within the culvert pipe.

9. The apparatus of claim 8, wherein the at least one vertical reinforcing member comprises recycled plastic.

10. Apparatus for gas and/or liquid exchange between a first area inside a bulk material pile and a second area outside the bulk material pile, the apparatus comprising:
    a conduit for placement partially within the first area and partially within the second area to provide a medium for the gas and/or liquid exchange; and
    a leaching chamber for placement above the conduit in the first area for gas and/or liquid exchange between the conduit and the bulk material in the bulk material pile.

11. The apparatus of claim 10, wherein the leaching chamber and conduit are substantially horizontal in the aggregate.

12. The apparatus of claim 11, further comprising one or more reinforcing members for reinforcing the leaching chamber.

13. The apparatus of claim 12, wherein the one or more reinforcing members comprises a horizontal reinforcing member and a vertical reinforcing member.

14. The apparatus of claim 11, wherein the leaching chamber comprises a plurality of openings sized to allow passage of the gas and/or liquid between the bulk material pile and the leaching chamber and discourage passage of the bulk material into the leaching chamber.

15. The apparatus of claim 11, wherein the leaching chamber comprises an elongated leaching chamber.

16. The apparatus of claim 11, further comprising a base of other than the bulk material on which to place the leaching chamber and the conduit.

17. The apparatus of claim 16, wherein the base comprises:
    a first layer of tension fabric;
    a second layer of tension fabric; and
    a layer of stone between the first layer and the second layer.

18. The apparatus of claim 10, wherein the bulk material pile comprises a solid waste pile.

19. A method of exchanging gas and/or liquid between a first area within a bulk material pile and a second area outside the bulk material pile, the method comprising steps of:
    placing a leaching chamber within the first area during formation of the bulk material pile; and
    establishing a conduit partially within the leaching chamber and partially within the second area to provide a medium for the gas and/or liquid exchange.

20. The method of claim 19, wherein the step of establishing comprises laying at least one pipe.

21. The method of claim 19, wherein the step of placing comprises steps of:
    laying at least two culvert pipes; and
    joining the at least two culvert pipes with a loose sleeve joint.

22. The method of claim 20, wherein the step of laying comprises laying at least one pipe of high density polyethylene.

23. The method of claim 20, wherein the step of establishing further comprises a step of coupling the at least one pipe to a valve in the second area.

24. The method of claim 19, wherein the step of establishing comprises establishing a conduit that is perforated in the first area.

25. The method of claim 19, further comprising a step of reinforcing the conduit with a reinforcing member.

26. The method of claim 19, wherein the step of placing comprises laying at least one culvert pipe.

27. The method of claim 26, wherein the laying at least one culvert pipe with a plurality of perforations in a lower portion thereof.

28. The method of claim 26, wherein the step of reinforcing comprises reinforcing the at least one culvert pipe with at least one vertical member within the at least one culvert pipe.

29. A method of exchanging gas and/or liquid between a first area within a bulk material pile and a second area outside the bulk material pile, the method comprising steps of:
   establishing a conduit partially within the first area and partially within the second area to provide a medium for the gas and/or liquid exchange; and
   placing a leaching chamber above the conduit in the first area for gas and/or liquid exchange between the conduit and bulk material in the bulk material pile.

30. The method of claim 29, wherein the steps of establishing and placing are performed during formation of the bulk material pile.

31. The method of claim 30, wherein the steps of establishing and placing are performed without digging a trench.

32. The method of claim 29, wherein the step of establishing comprises establishing in the first area a substantially horizontal conduit in the aggregate, and wherein the step of placing comprises placing a substantially horizontal leaching chamber in the aggregate in the first area.

33. The method of claim 32, wherein the step of placing comprises installing one or more leaching chamber reinforcing members.

34. The method of claim 33, wherein the step of installing comprises installing a horizontal reinforcing member and a vertical reinforcing member within the leaching chamber.

35. The method of claim 32, wherein the step of placing comprises placing a leaching chamber comprising a plurality of openings sized to allow passage of the gas and/or liquid between the bulk material pile and the leaching chamber and discourage passage of the bulk material into the leaching chamber.

36. The method of claim 32, wherein the step of placing comprises placing an elongated leaching chamber over the conduit in the first area.

37. The method of claim 32, further comprising, prior to the steps of establishing and placing, a step of forming a base for the conduit and porous medium of other than the bulk material in the first area.

38. The method of claim 37, wherein the step of forming comprises:
   laying a first sheet of tension fabric;
   placing stone over the first sheet; and
   laying a second sheet of tension fabric over the stone.

39. The apparatus of claim 1, wherein the at least one leaching chamber and the conduit are substantially horizontal in the aggregate.

40. The method of claim 26, further comprising a step of reinforcing the at least one culvert pipe with at least one vertically placed reinforcing member therewithin.

41. Apparatus for gas and/or liquid exchange between a first area inside a bulk material pile and a second area outside the bulk material pile, the apparatus comprising:
   a conduit for placement partially within the first area without digging a trench during formation of the bulk material pile and partially within the second area to provide a medium for the gas and/or liquid exchange, wherein the conduit comprises at least one pipe comprising at least one first pipe of a first diameter with a plurality of perforations in a lower half thereof, at least one second pipe of a second diameter smaller than the first diameter situated within the at least one first pipe, and wherein the porous medium is for placement around the lower half of the at least one first pipe; and
   a porous medium for placement around the conduit in the first area without digging a trench during formation of the bulk material pile for gas and/or liquid exchange between the conduit and bulk material in the bulk material pile.

42. The apparatus of claim 41, further comprising a reinforcing member for the conduit, wherein the conduit comprises at least one pipe, and wherein the reinforcing member comprises at least one reinforcing member for vertical placement within the at least one pipe.

43. The apparatus of claim 42, wherein the at least one pipe is perforated in a lower half thereof, and wherein the porous medium is for placement around a lower half of the at least one pipe.

44. The apparatus of claim 42, wherein the at least one vertical reinforcing member comprises recycled plastic.

45. A method of exchanging gas and/or liquid between a first area within a bulk material pile and a second area outside the bulk material pile, the method comprising steps of:
   establishing a conduit partially within the first area without digging a trench during formation of the bulk material pile and partially within the second area to provide a medium for the gas and/or liquid exchange, wherein the step of establishing comprises laying at least one pipe by laying at least one first pipe of a first diameter with a plurality of perforations in a lower half thereof, laying at least one second pipe of a second diameter smaller than the first diameter within the at least one first pipe, and wherein the step of placing comprises placing the porous medium around the lower half of the at least one first pipe; and
   placing a porous medium around the conduit in the first area without digging a trench during formation of the bulk material pile for gas and/or liquid exchange between the conduit and bulk material in the bulk material pile.

46. A method of exchanging gas and/or liquid between a first area within a bulk material pile and a second area outside the bulk material pile, the method comprising steps of:
   establishing a conduit partially within the first area without digging a trench during formation of the bulk material pile and partially within the second area to provide a medium for the gas and/or liquid exchange, wherein the step of establishing comprises laying at least one pipe;
   placing a porous medium around the conduit in the first area without digging a trench during formation of the bulk material pile for gas and/or liquid exchange between the conduit and bulk material in the bulk material pile; and reinforcing the conduit with a reinforcing member, wherein the step of reinforcing comprises reinforcing the at least one pipe with at least one vertically placed reinforcing member within the at least one pipe.

47. The method of claim 46, wherein the at least one pipe comprises at least one pipe with a plurality of perforations in a lower half thereof, and wherein the step of placing comprises placing the porous medium around the lower half of the at least one pipe.

48. The method of claim 46, wherein the step of reinforcing comprises reinforcing with a reinforcing member comprising recycled plastic.

* * * * *

UNITED STATES PATENT AND TRADEMARK OFFICE
CERTIFICATE OF CORRECTION

PATENT NO. : 5,924,821
DATED : July 20, 1999
INVENTOR(S) : Hansen et al.

It is certified that error appears in the above-identified patent and that said Letters Patent is hereby corrected as shown below:

Col. 7, line 15, delete " "CULVERT" " and replace with --CULVERT--.

IN THE CLAIMS:

Claim 27: Col. 9, line 11, after "wherein the", insert --step of placing comprises--.

Signed and Sealed this

Twenty-first Day of March, 2000

Attest:

Attesting Officer

Q. TODD DICKINSON

Commissioner of Patents and Trademarks